United States Patent
Nakashima

(10) Patent No.: US 9,244,640 B2
(45) Date of Patent: Jan. 26, 2016

(54) IMAGE PROCESSING APPARATUS, IMAGE PROCESSING METHOD, WEB SERVER, CONTROL METHOD FOR THE SAME, AND STORAGE MEDIUM

(71) Applicant: CANON KABUSHIKI KAISHA, Tokyo (JP)

(72) Inventor: Kosuke Nakashima, Great Neck, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/071,256

(22) Filed: Nov. 4, 2013

(65) Prior Publication Data

US 2014/0126021 A1 May 8, 2014

(30) Foreign Application Priority Data

Nov. 5, 2012 (JP) ................. 2012-243850

(51) Int. Cl.
*G06F 3/12* (2006.01)
*H04N 1/00* (2006.01)
*G06F 17/30* (2006.01)
*H04L 29/06* (2006.01)
*H04L 29/08* (2006.01)
*G06K 15/00* (2006.01)

(52) U.S. Cl.
CPC ............ *G06F 3/1236* (2013.01); *G06F 3/1296* (2013.01); *H04L 67/02* (2013.01); *H04N 1/00244* (2013.01); *G06F 3/1297* (2013.01); *G06F 17/3089* (2013.01); *G06K 15/00* (2013.01); *H04L 29/06* (2013.01); *H04L 29/08072* (2013.01); *H04N 2201/0075* (2013.01); *H04N 2201/0094* (2013.01)

(58) Field of Classification Search
USPC ......... 358/1.13, 1.14, 1.15, 401, 448; 399/81, 399/82; 709/203, 219
See application file for complete search history.

(56) References Cited

U.S. PATENT DOCUMENTS

| | | | |
|---|---|---|---|
| 8,018,610 B2 | 9/2011 | Mathieson et al. | 358/1.15 |
| 8,583,559 B2 | 11/2013 | Nakashima | |
| 2010/0053676 A1* | 3/2010 | Sugimoto | 358/1.15 |
| 2010/0149592 A1 | 6/2010 | Yoshida | |
| 2011/0004874 A1 | 1/2011 | Nakashima | |
| 2011/0134453 A1* | 6/2011 | Sakiyama | 358/1.13 |
| 2011/0145371 A1 | 6/2011 | Sato | 709/219 |
| 2011/0261398 A1* | 10/2011 | Mihara et al. | 358/1.15 |
| 2013/0250347 A1* | 9/2013 | Kono | 358/1.15 |
| 2014/0068423 A1 | 3/2014 | Nakashima | |

FOREIGN PATENT DOCUMENTS

| | | | |
|---|---|---|---|
| JP | 2006-127503 A | 5/2006 | |
| JP | 2011-130123 A | 6/2011 | |

OTHER PUBLICATIONS

Apr. 10, 2014 Search Report in UK Patent Appln. No. GB1319422.0.

* cited by examiner

*Primary Examiner* — Vu B Hang
(74) *Attorney, Agent, or Firm* — Fitzpatrick, Cella, Harper & Scinto

(57) ABSTRACT

This image processing apparatus displays a web page received from a web server, and when a setting related to scan processing is performed via the displayed web page, causes a transition to a state in which execution of scan processing can be instructed using a predetermined hardware key, and when an execution of scan processing being instructed using the predetermined hardware key, executes scan processing based on the setting performed via the web page.

8 Claims, 16 Drawing Sheets

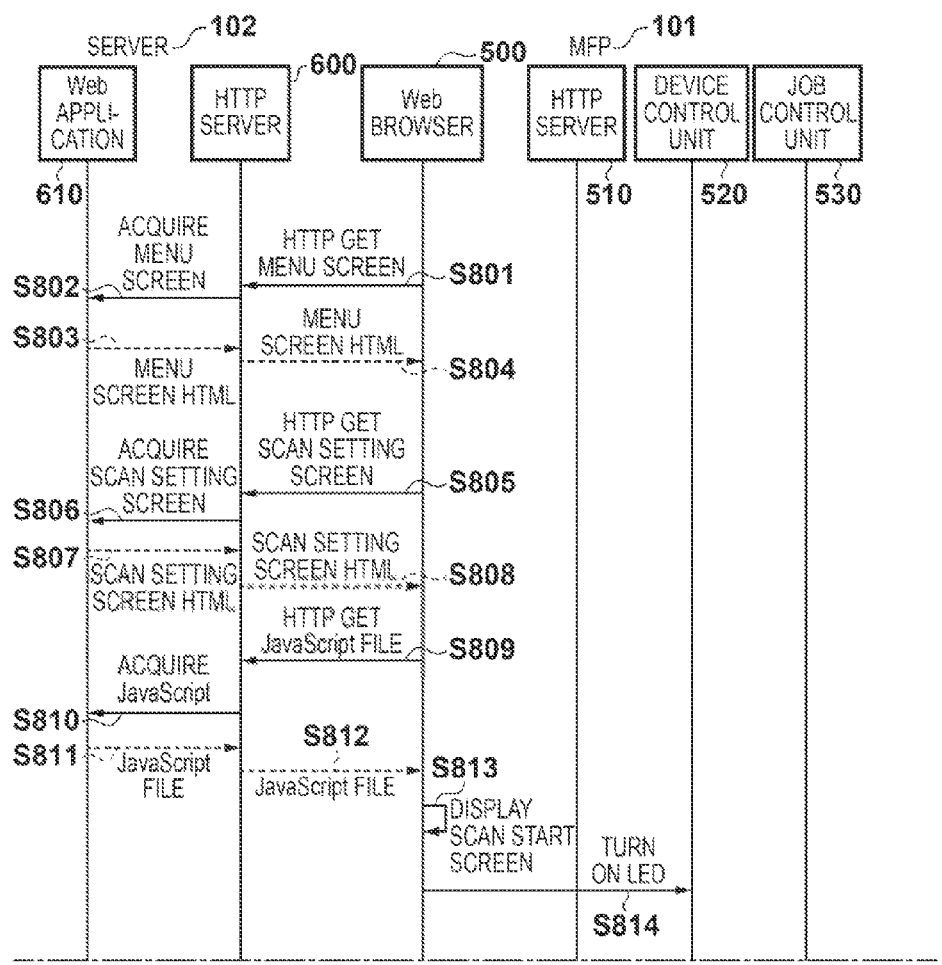

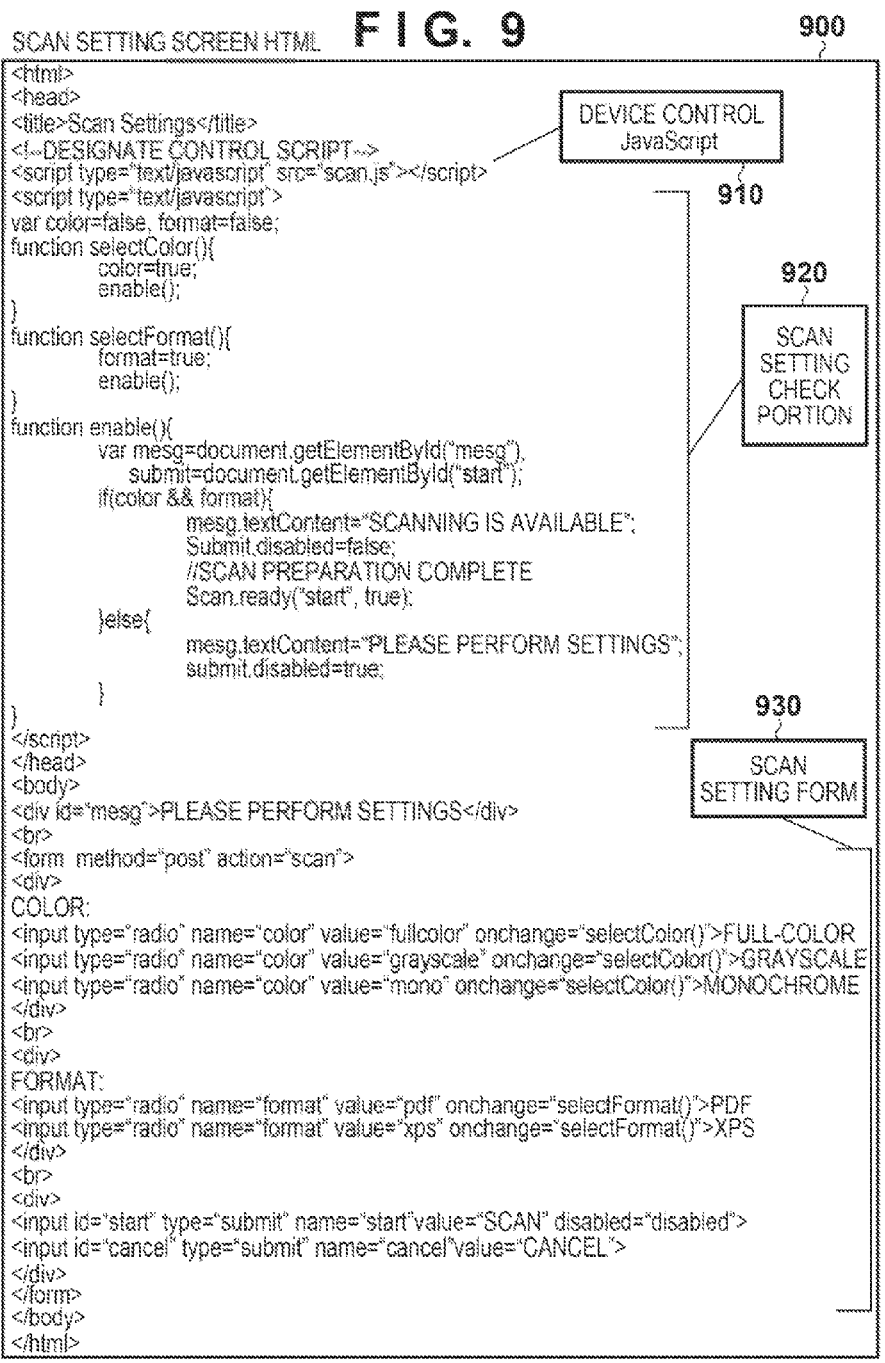

FIG. 10

```
POST/scan HTTP/1.1
Host:xxx.yyy.zzz
User-Agent:Mozilla/5.0 (MFP; IR-S/1.3;like Gecko)
Content-Type:application/x-www-form-urlencoded color="fullcolor"&format="pdf"&start="SCAN"
```

FIG. 11

```
<env:Envelope xmlns:env="http://www.w3.org/2003/05/soap-encoding">
  <env:Body>
    <scan:PerformJob xmlns:scan="http://www.canon.com/ns/scan/">
      <scan:jobInstruction>
        <scan:resolution>300x300</scan:resolution>
        <scan:color>fullcolor</scan:color>
        <scan:format>pdf</scan:format>
        <scan:host>xxx.yyy.zzz</scan:host>
        <scan:path>upload/test</scan:fileName>
      </scan:jobInstruction>
    </scan:PerformJob>
  </env:Body>
</env:Envelope>
```

F I G. 16B
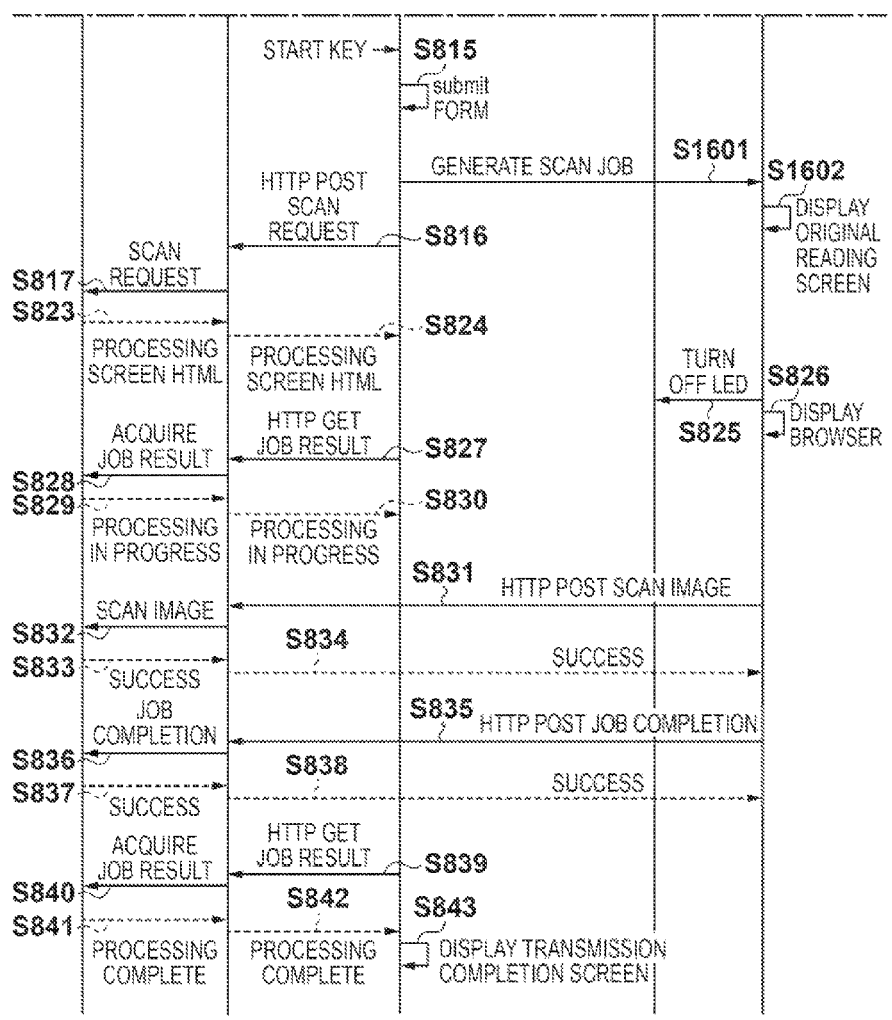

FIG. 17B

```
function performJob(){
        var color;
        if(document.forms[0].color[0].checked){
                color="fullcolor";
        }else if(document.forms[0].color[1].checked){
                color="grayscale";
        }else{
                color="mono";
        }
        var format=document.forms[0].format[0].checked? "pdf":"xps";
        var resolution="300x300";
        var host="xxx.yyy.zzz";
        var path="upload/test";
        var params={'color':color,'format':format,'resolution':resolution,'host':host,'path':path};
        // SCAN JOB EXECUTION
        var jobId=Scan.start(params);
        document.forms[0].jobId=jobId;
        return true;
}
</script>
</head>
<body>
<div id="mesg">PLEASE PERFORM SETTINGS</div>
<br>
<form method="post" onsubmit="return performJob()" action="scan">
<div>
COLOR:
<input type="radio" name="color" value="fullcolor" onchange="selectColor()">FULL-COLOR
<input type="radio" name="color" value="grayscale" onchange="selectColor()">GRAYSCALE
<input type="radio" name="color" value="mono" onchange="selectColor()">MONOCHROME
</div>
<br>
<div>
FORMAT:
<input type="radio" name="format" value="pdf" onchange="selectFormat()">PDF
<input type="radio" name="format" value="xps" onchange="selectFormat()">XPS
</div>
<br>
<div>
<input type="hidden" name="jobId">
<input id="start" type="submit" name="start" value="SCAN" disabled="disabled">
<input id="cancel" type="submit" name="cancel" value="CANCEL">
</div>
</form>
</body>
</html>
```

1730 — SCAN JOB EXECUTION PORTION
1740 — SCAN SETTING FORM
1700

IMAGE PROCESSING APPARATUS, IMAGE PROCESSING METHOD, WEB SERVER, CONTROL METHOD FOR THE SAME, AND STORAGE MEDIUM

BACKGROUND OF THE INVENTION

1. Field of the Invention

The present invention relates to an image processing apparatus that is connected to a server via a network and includes a browser that displays an operation screen provided by the server, an image processing method, a web server, a control method for the same, and a storage medium.

2. Description of the Related Art

It is known that an information processing apparatus such as a PC is connected to a web server over a network, and an operation screen provided by the web server is displayed in a web browser included in the information processing apparatus. In such a case, the web browser of the information processing apparatus first requests the operation screen from the web server. Then, a web application on the web server sends HTML data for causing the web browser to display the operation screen to the information processing apparatus in response to the request from the information processing apparatus. The web browser of the information processing apparatus analyzes the HTML data that was received and displays an operation screen based on the HTML data description. Furthermore, when a user inputs an instruction via the operation screen displayed in the web browser, the web browser notifies the web server of the instruction that was input. Then, the web application on the web server that received the notification executes processing according to the instruction that was input.

Recently, web browsers such as those described above have been included in MFPs (Multi-Function Peripherals) that include scanners and printers. For example, Japanese Patent Laid-Open No. 2006-127503 proposes that a web server provides an operation screen for using functions included in an MFP. That is to say, a user of the MFP inputs an instruction to the MFP via an operation screen displayed in a web browser. Then, the web browser of the MFP notifies the web server of the instruction that was input. The web server that received the notification requests the MFP to execute various types of processing, in accordance with the content of the instruction that was input by the user. Then, after receiving the request, the MFP executes the requested processing. Thus, there is no need to hold all menu data for operating the MFP in the MFP, and a menu data change can be performed easily over a web server.

Additionally, Japanese Patent Laid-Open No. 2011-130123 discloses that processes such as reading and outputting with respect to the MFP are realized by the input of a hardware key (start key) mounted in the MFP being accepted by an operation screen displayed in a web browser. According to this, it is possible to provide the same operability as a normal MFP even when a web application is used.

However, the following problems are present in the aforementioned conventional technologies. For example, even when using the technique disclosed in Japanese Patent Laid-Open No. 2011-130123, the web application cannot control the association of a useable hardware key (start key) and a software key using an application that is included in the MFP in advance (hereinafter referred to as a "native application"). Because of this, it is difficult to provide the user with the same operability as a normal native application in the case where multiple software keys are included on the operation screen of the web application.

SUMMARY OF THE INVENTION

The present invention enables realization of a mechanism for realizing operability that is similar to that of a native application capable of using both a hardware key and a software key, in a web application.

One aspect of the present invention provides an image processing apparatus comprising: a reception unit configured to receive a web page from a web server; a display unit configured to display the web page received by the reception unit; a control unit configured to, when a setting related to scan processing is performed via the web page displayed by the display unit, cause a transition to a state in which execution of scan processing can be instructed using a predetermined hardware key; and an execution unit configured to, when an execution of scan processing is instructed using the predetermined hardware key, execute scan processing based on the setting performed via the web page.

Another aspect of the present invention provides a web server comprising: a reception unit configured to receive a request from an image processing apparatus; and a transmission unit configured to transmit a web page in response to the request received by the reception unit, wherein the web page includes a description for causing the image processing apparatus to, when a setting related to scan processing is performed via the web page, transition to a state in which execution of scan processing can be instructed using a predetermined hardware key.

Still another aspect of the present invention provides an image processing method comprising: receiving a web page from a web server; displaying the web page received in the receiving step; causing, when a setting related to scan processing is performed via the web page displayed in the displaying step, a transition to a state in which execution of scan processing can be instructed using a predetermined hardware key; and executing, when an execution of scan processing is instructed using the predetermined hardware key, scan processing based on the setting performed via the web page.

Yet still another aspect of the present invention provides a control method for a web server, the method comprising: receiving a request from an image processing apparatus; and transmitting a web page in response to the request received in the receiving step, wherein the web page includes a description for causing the image processing apparatus to, when a setting related to scan processing being performed via the web page, transition to a state in which execution of scan processing can be instructed using a predetermined hardware key.

Still yet another aspect of the present invention provides a non-transitory computer readable storage medium storing a program for causing a computer to execute the methods.

Further features of the present invention will become apparent from the following description of exemplary embodiments with reference to the attached drawings.

BRIEF DESCRIPTION OF THE DRAWINGS

FIGS. 8A and 8B are a diagram showing a sequence of processes executed in an information processing system.

FIG. 9 is a diagram showing an example of HTML data of a scan setting screen 701.

FIG. 10 is a diagram showing an example of a scan request message.

FIG. 11 is a diagram showing an example of a SOAP request message.

FIGS. 16A and 16B are a diagram showing a sequence of processes executed in an information processing system according to the second embodiment.

FIGS. 17A and 17B are a diagram showing an example of HTML data of the scan setting screen 701 according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Information Processing System

Figure 1:
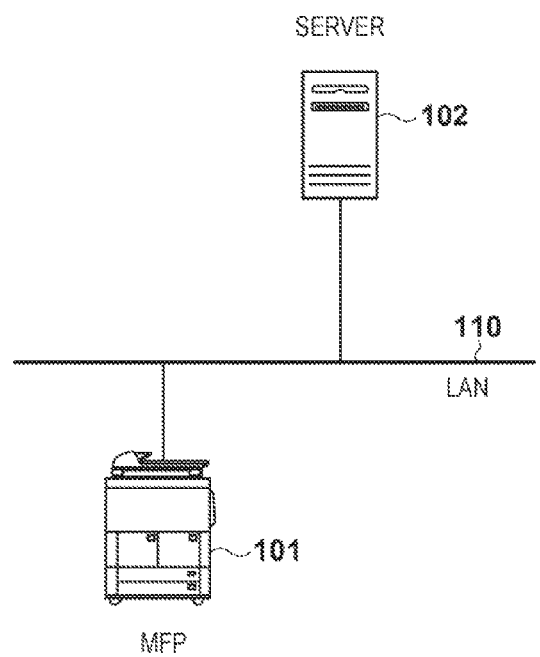
FIG. 1 is a diagram showing an overall configuration of an information processing system that includes an MFP 101 and a server 102.

A first embodiment of the present invention will be described below with reference to FIGS. 1 to 14. First, an overall configuration of an information processing system will be described with reference to FIG. 1. As shown in FIG. 1, an MFP 101 and a server 102 are communicably connected to a LAN 110. Note that in the present embodiment, it is assumed that the two aforementioned devices are included in the information processing system, but the present invention is not limited to this, and multiple other MFPs and multiple other servers may be included. The MFP 101 has a web browser function and executes a web application provided by the server 102. That is to say, the web browser of the MFP 101 displays a screen for the web application on the operation unit of the MFP 101 in accordance with screen information provided by the server 102. Note that in the present embodiment, the MFP 101 is described as an example of an information processing apparatus. Other image forming apparatuses and image reading apparatuses may be applied as information processing devices that are applicable to the present invention.

Here, "web application" refers to an application provided by the server 102. On the other hand, applications installed beforehand in the MFP 101 will be referred to as "native applications". The present embodiment proposes a mechanism for bringing the operability of a web application as close as possible to the operability of a native application.

Hardware Configuration of MFP

Figure 2:
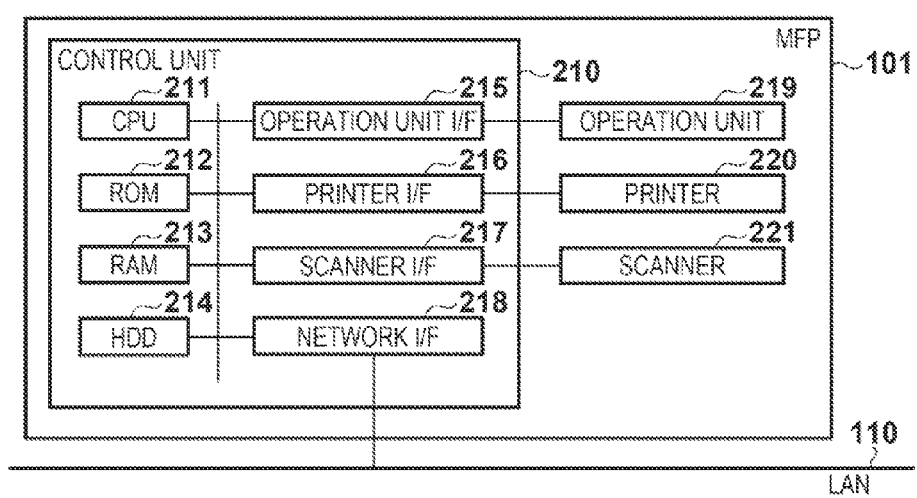
FIG. 2 is a block diagram showing the hardware configuration of the MFP 101.

The hardware configuration of the MFP 101 will be described next with reference to FIG. 2. The MFP 101 includes a control unit 210, an operation unit 219, a printer 220, and a scanner 221. Additionally, the control unit 210 includes a CPU 211, a ROM 212, a RAM 213, an HDD 214, an operation unit I/F 215, a printer I/F 216, a scanner I/F 217, and a network I/F 218. The control unit 210 performs overall control of operations of the MFP 101.

The CPU 211 reads out a control program stored in the ROM 212 and performs various types of control such as reading/scanning control and transmission control. The RAM 213 is used as a main memory and as a temporary storage area such as a work area for the CPU 211. The HDD 214 stores image data and various types of programs. The operation unit I/F 215 is connected to the operation unit 219 and the control unit 210. The operation unit 219 includes hardware keys and a liquid crystal display unit that has a touch panel function. Also, a later-described web browser function is included in the MFP 101, and the web browser of the MFP 101 analyzes HTML data received from the server 102 and displays an operation screen based on the received HTML data description on the liquid crystal display unit of the operation unit 219.

The printer I/F 216 connects the printer 220 to the control unit 210. Image data to be printed by the printer 220 is transferred from the control unit 210 via the printer I/F 216 and printed on a recording medium in the printer 220. The scanner I/F 217 connects the scanner 221 to the control unit 210. The scanner 221 generates image data by scanning an image on an original and inputs the image data to the control unit 210 via the scanner I/F 217. The network I/F 218 connects the control unit 210 (MFP 101) to the LAN 110. The network I/F 218 transmits image data and information to external devices on the LAN 110 (e.g., the server 102) and receives various types of information from the external devices on the LAN 110.

Configuration of Operation Unit

Figure 3:
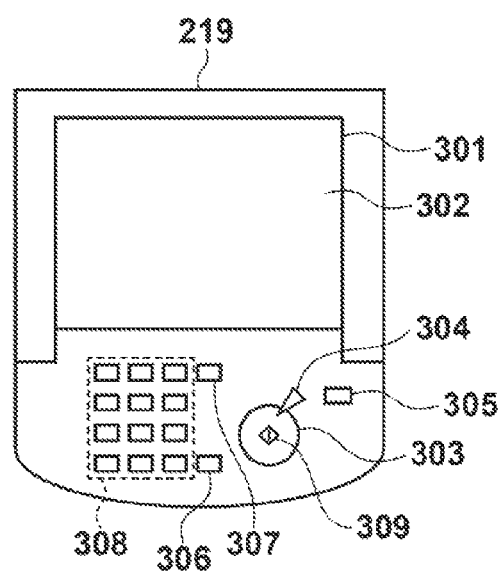
FIG. 3 is a diagram showing an external configuration of an operation unit 219.

The configuration of the operation unit 219 will be described next with reference to FIG. 3. As shown in FIG. 3, the operation unit 219 has a liquid crystal display unit 301 that is a touch panel 302 arranged on an LCD. The liquid crystal display unit 301 displays software keys and an operation screen in which later-described native function modules and a web browser are displayed, and when the displayed keys are pressed, positional information indicating the position that was pressed is transmitted to the CPU 211.

Also, the operation unit 219 is provided with various types of permanent hardware keys (or buttons) such as a start key 303, a stop key 304, a reset key 305, a guide key 306, a top menu key 307, and numeric value keys 308. The start key 303 is a key for instructing the start of processing of the image processing apparatus, and an LED display unit 309 is provided in the central portion of the start key 303. The LED display unit 309 indicates whether or not the start key 303 is in a useable state according to the LED on/off state. The stop key 304 is a key for stopping an operation that is in progress. The reset key 305 is a key that is used when settings are to be initialized. The guide key 306 is a key for displaying the method of using the MFP 101. The top menu key 307 is a key for displaying the top menu screen for allowing the selection of a function of the MFP 101. The numeric value keys 308 are keys for inputting numeric values. With the MFP 101 according to the present embodiment, it is possible to use the above-described hardware keys in a web application as well.

Hardware Configuration of Server

Figure 4:
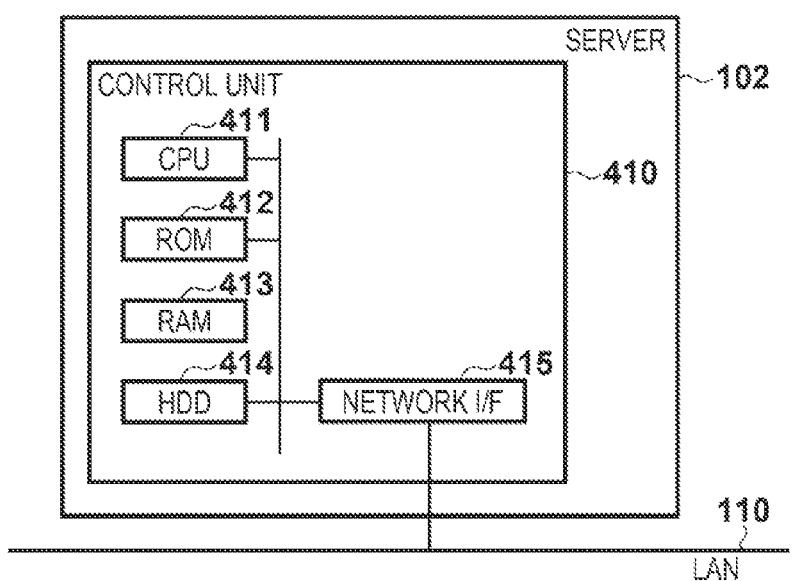
FIG. 4 is a block diagram showing the hardware configuration of the server 102.

The hardware configuration of the server 102 will be described next with reference to FIG. 4. The server 102 includes a control unit 410. The control unit 410 includes a CPU 411, a ROM 412, a RAM 413, an HDD 414, and a network I/F 415. The control unit 410 performs overall control of operations of the server 102.

The CPU 411 reads out a control program stored in the ROM 412 and executes various types of control processing. The RAM 413 is used as a main memory and as a temporary storage area such as a work area for the CPU 411. The HDD 414 stores image data and various types of programs. The network I/F 415 connects the control unit 410 (server 102) to the LAN 110. The network I/F 415 transmits and receives various types of information to and from other devices on the LAN 110.

Software Configuration of MFP

Figure 5:
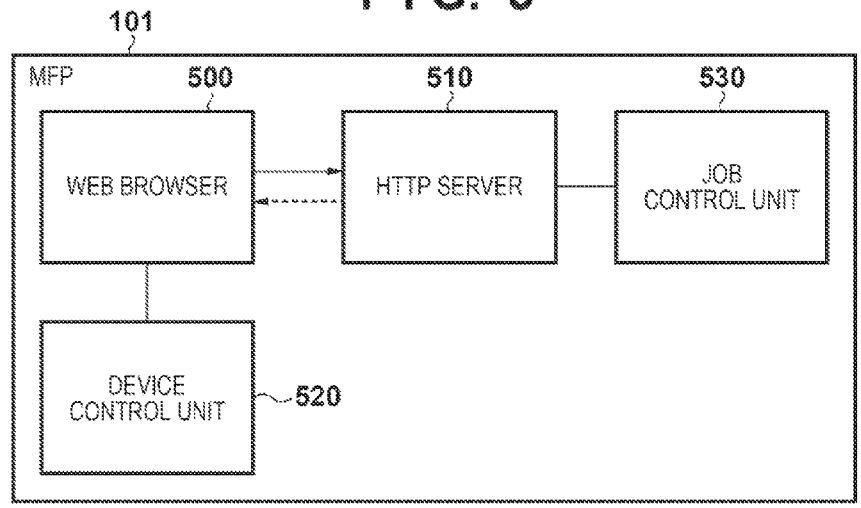
FIG. 5 is a block diagram showing the software configuration of the MFP 101.

The software configuration of the MFP 101 will be described next with reference to FIG. 5. The functional units shown in FIG. 5 are realized by the CPU 211 included in the MFP 101 executing a control program. The MFP 101 includes a web browser 500, an HTTP server 510, a device control unit 520, and a job control unit 530.

The web browser 500 transmits a request according to the HTTP protocol (hereinafter referred to as an HTTP request) to the server 102 and receives a response to the request (hereinafter referred to as an HTTP response). Then, the web browser 500 analyzes the received HTTP response, displays an operation screen, and processes JavaScript (registered trademark) included in the received response. Multiple commands for executing processing are included in the script. The web browser 500 can re-write the operation screen, accept input from various types of hardware keys on the operation unit 219, and instruct the device control unit 520 to turn on and turn off the LED display unit 309 by processing the JavaScript. Note that the HTTP server 510 receives the HTTP request from the web browser 500 and assigns the HTTP request to the designated web service. The job control unit 530 is an example of a web service made publicly available by the HTTP server 510.

The device control unit 520 controls various devices in the MFP 101. For example, the device control unit 520 controls the turning on and turning off of the LED display unit 309 of the operation unit 219 via the operation unit I/F 215. Upon accepting an instruction for turning on or turning off the LED display unit 309 from the web browser 500, the device control unit 520 turns on or turns off the LED display unit 309. Note that when the LED display unit 309 is turned on, the web browser 500 performs control such that the start key 303 is useable, and when the LED display unit 309 is turned off, the web browser 500 performs control such that the start key 303 is not useable.

The job control unit 530 executes jobs including scanning processing using the scanner 221, print processing using the printer 220, and transmission processing via the network I/F 218. Upon receiving a SOAP request from a later-described web application 610, the job control unit 530 interprets the SOAP request and executes the job. Then, the job control unit 530 transmits a SOAP response including job execution results to the web application 610. Also, the job control unit 530 displays an operation screen for accepting job control operations performed by the user on the operation unit 219. Note that in the present embodiment, a job in which an original is scanned, a file is generated, and the file is transmitted to the server 102 is described as an example of a job executed by the MFP 101, but the present invention can also be applied to a job in which print processing using the printer 220 or the like is executed.

Software Configuration of Server

Figure 6:
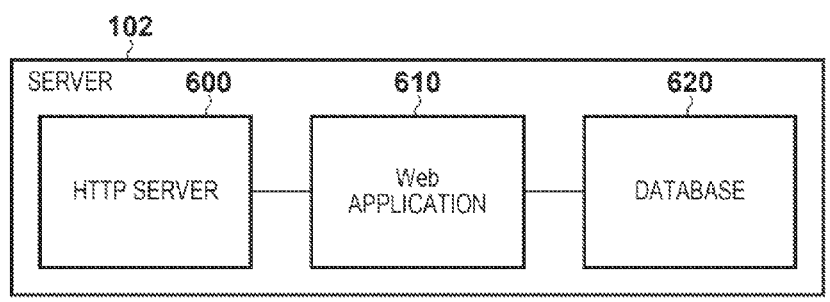
FIG. 6 is a block diagram showing the software configuration of the server 102.

The software configuration of the server 102 will be described next with reference to FIG. 6. The functional units shown in FIG. 6 are realized by the CPU 411 included in the server 102 executing a control program. The server 102 includes an HTTP server 600, a web application 610, and a database 620.

Upon receiving an HTTP request from the web browser 500, the HTTP server 600 assigns the HTTP request to the web application 610 designated by the URL. The web application 610 generates HTML data to be displayed in the web browser 500 in response to the HTTP request from the web browser 500. Then, the web application 610 transmits the generated HTML data as an HTTP response to the web browser 500. Also, the web application 610 processes a file upload request transmitted from the job control unit 530, and registers the requested data in the database 620.

Screen Transition

Figure 7:
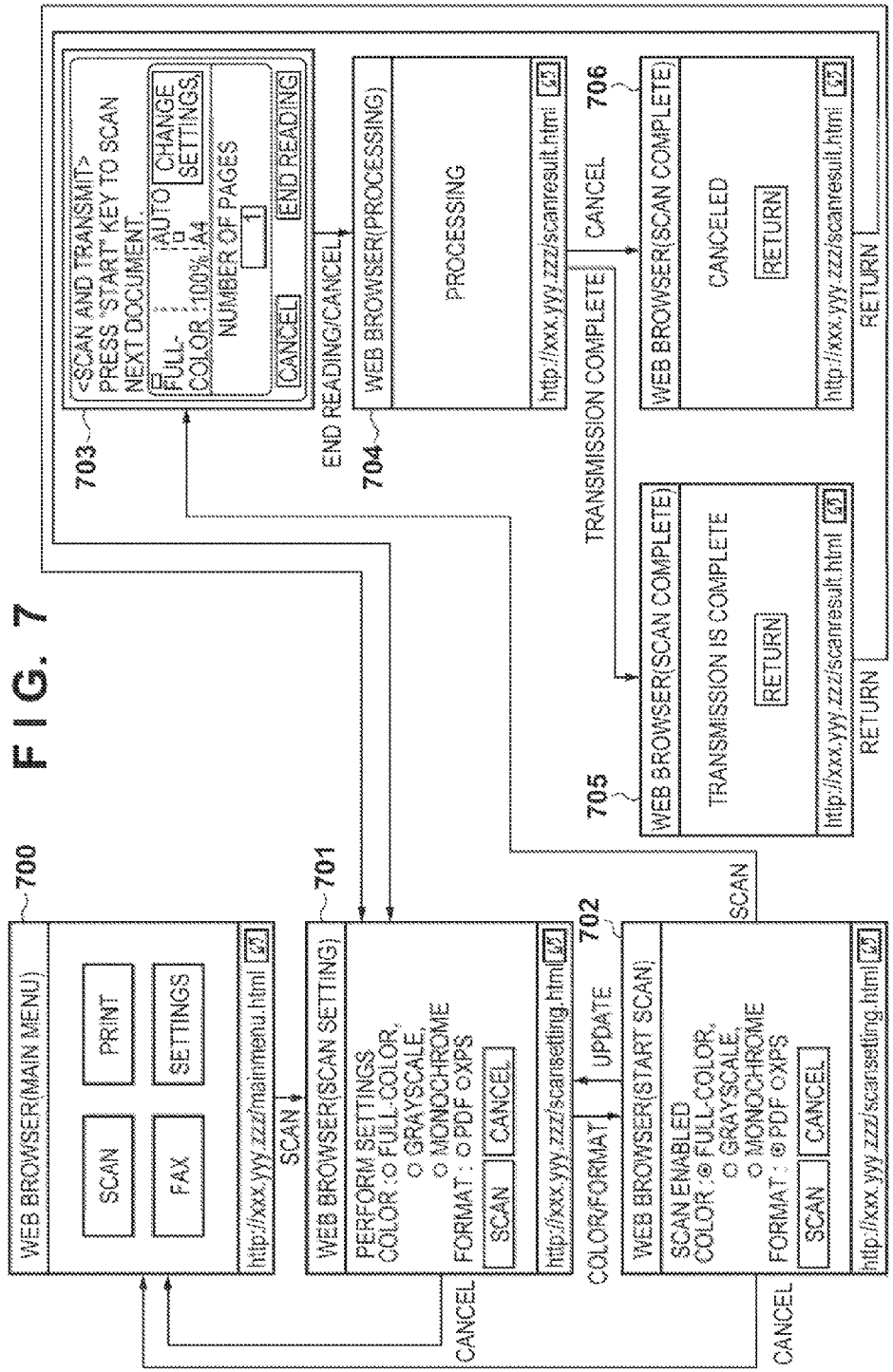
FIG. 7 is a diagram showing the transition of screens displayed on the operation unit 219 of the MFP 101.

An example of screen transitions in the case where the web browser 500 of the MFP 101 is to start scanning processing in the present information processing system will be described next with reference to FIG. 7. The screens included in FIG. 7, excluding a reading screen 703, are screens displayed on the operation unit 219 as a result of the web browser 500 processing the HTML data sent as a response by the web application 610. On the other hand, the reading screen 703 is a screen displayed on the operation unit 219 in order for the job control unit 530 to accept a job control operation. In other words, the reading screen 703 is a screen provided by a native application, and the screens other than the reading screen 703 are screens provided by a web application.

A menu screen 700 is a selection screen for selecting a function when a function of the MFP 101 is to be used. When a function is selected on this screen, the screen corresponding to the selected function is transitioned to. For example, when a scan button for selecting the scan function is pressed, the web browser 500 subsequently displays a scan setting screen 701 on the operation unit 219.

The scan setting screen 701 is a screen for inputting scan settings. The scan setting screen 701 includes radio buttons for selecting the reading color, radio buttons for selecting the image file format, a scan start button for instructing the start of scanning, and a cancel button for returning to the menu screen 700. The radio buttons for selecting the reading color include the options "color", "grayscale", and "monochrome". Additionally, the radio buttons for selecting the image file format include the options "PDF" and "XPS". The scan start button is not in a selectable state on the scan setting screen 701. If it is in an unselectable state, it is displayed in grayout, as shown in FIG. 7. Subsequently, when the scan color and format are selected, the web browser 500 displays a scan start screen 702 on the operation unit 219. On the other hand, when the cancel button is pressed, the web browser 500 displays the menu screen 700 on the operation unit 219.

The scan start screen 702 is a screen for instructing the start of scanning. Similarly to the scan setting screen 701, the scan start screen 702 includes radio buttons for selecting the reading color, radio buttons for selecting the image file format, a scan start button for instructing the start of scanning, and a cancel button for returning to the menu screen 700. On the scan start screen 702, the scan start button is in a selectable state. When the scan start button is pressed, the job control unit 530 displays the reading screen 703 on the operation unit 219. On the other hand, when the cancel button is pressed, the web browser 500 displays the menu screen 700 on the operation unit 219.

The reading screen 703 is a screen for instructing a scan operation of an original. The reading screen 703 includes an end scan button and a cancel button. If the end scan button or the cancel button is pressed, the job control unit 530 displays the operation screen of the web browser 500 on the operation unit 219. As a result of this, the web browser 500 displays a processing-in-progress screen 704 on the operation unit 219.

The processing-in-progress screen 704 is a screen for indicating that job processing is in progress. When the job control unit 530 completes transmission of the scan image to the web application 610, the web browser 500 displays a completion screen 705 on the operation unit 219. On the other hand, when the job control unit 530 cancels the scan processing, the web browser 500 displays a cancel screen 706.

The completion screen 705 is a screen indicating that the transmission of the scan image to the web application 610 is complete. The completion screen 705 includes a return button for transitioning to the scan setting screen 701. When the return button is pressed, the web browser 500 displays the scan setting screen 701. The cancel screen 706 is a screen indicating that scan processing has been canceled. The cancel screen 706 includes a return button for transitioning to the scan setting screen 701. When the return button is pressed, the web browser 500 displays the scan setting screen 701 on the operation unit 219.

Processing Sequence

A processing sequence executed in the information processing system will be described next with reference to FIGS. 8A and 8B. In the processing sequence shown in FIGS. 8A and 8B, the processing of step S801 is started when the URL for the menu screen 700 is input to the web browser 500 and an instruction is given to open a page. Note that the below-described processing is realized by control programs being read out from the ROMs 212 and 412 to the RAMs 213 and 413 by the CPU 211 of the MFP 101 and by the CPU 411 of the server 102, and executed. Specifically, the CPU 211 controls the processing of the web browser 500, the HTTP server 510, the device controller 520, and the job control unit 530. On the other hand, the CPU 411 controls the processing of the web application 610 and the HTTP server 600.

In step S801, the web browser 500 transmits an HTTP request for requesting the acquisition of the menu screen 700 to the HTTP server 600 in accordance with the input URL. Subsequently, in step S802, the HTTP server 600 requests the web application 610 to acquire the screen information of the menu screen 700. In step S803, the web application 610 responds by transmitting the screen information of the menu screen 700 to the HTTP server 600. In step S804, an HTTP response for transmitting the received screen information of the menu screen 700 is transmitted from the HTTP server 600 to the web browser 500.

The web browser 500 interprets the menu screen HTML that was received and displays it on the menu screen 700. When the scan button included on the menu screen 700 is pressed, the web browser 500 moves to the processing of step S805. In step S805, an HTTP request for requesting the acquisition of the scan setting screen 701 is transmitted from the web browser 500 to the HTTP server 600. In step S806, the HTTP server 600 requests the web application 610 to acquire the screen information of the scan setting screen 701. In step S807, the web application 610 responds by transmitting the screen information of the scan setting screen 701 to the HTTP server 600. In step S808, the HTTP server 600 transmits an HTTP response for transmitting the screen information of the scan setting screen 701 to the web browser 500.

FIG. 9 shows an example of HTML data indicating the screen information of the scan setting screen 701 transmitted by the web application 610 (hereinafter referred to as scan setting screen HTML 900). The scan setting screen HTML 900 includes device control JavaScript 910 and a scan setting check portion 920 in the head portion, and a scan setting form 930 in the body portion.

A "Scan.ready" function, which is a method for instructing scan preparation completion, is defined in the device control JavaScript 910. Commands for executing processing are defined in this type of function. Specifically, when the "Scan.ready" function is called, the web browser 500 accepts the input of the start key 303 and furthermore instructs the device control unit 520 to turn on the LED display unit 309. The internal processing of the "Scan.ready" function will be described in detail later using the flowcharts shown in FIGS. 12 to 14. Additionally, the device control JavaScript 910 is referenced as an external file. Accordingly, upon receiving the scan setting screen HTML 900, the web browser 500 acquires the device control JavaScript 910 from the HTTP server 600.

In the case where the reading color and format have been selected on the scan setting screen 701, the scan setting check portion 920 describes processing for the web browser 500 to display the scan start screen 702 and turn on the LED. Specifically, when the reading color or the format is selected, the web browser 500 calls the "selectColor" function or the "selectFormat" function. Furthermore, the web browser 500 calls the "enable" function from the "selectColor" function or the "selectFormat" function. If both the reading color and the format have been set with the "enable" function, the web browser 500 sets the message on the scan setting screen 701 to "scan enabled", and sets the "disabled" attribute of the scan start button to "false". As a result, the scan setting screen 701 is changed to the scan start screen 702. Furthermore, the web browser 500 calls the "Scan.ready" function. "Start", which is the first argument of the "Scan.ready" function, indicates the button ID associated with the start key 303, and the second argument "true" indicates that the LED display unit 309 is to be turned on. As a result of processing the "Scan.ready" function, the web browser 500 instructs the device control unit 520 to associate the acceptance of input from the start key 303 with the press of the start button, and to turn on the LED display unit 309.

The scan setting form 930 describes a form for selecting the reading color and format and requesting the web application 610 to start scanning. Specifically, it describes radio buttons "color" for selecting the reading color, radio buttons "format" for selecting format, the submit button "start" for instructing the start of scanning, and the submit button "cancel" for instructing cancellation. When a radio button "color" is selected, the web browser 500 calls a function "selectColor", which is defined in the scan setting check portion 920. Also, when a radio button "format" is selected, the web browser 500 calls a function "selectFormat" that is defined in the scan setting check portion 920. Then, when the submit button "start" or "cancel" is pressed, the web browser 500 transmits the values of the radio buttons and the submit button to the web application 610.

Figure 8B:
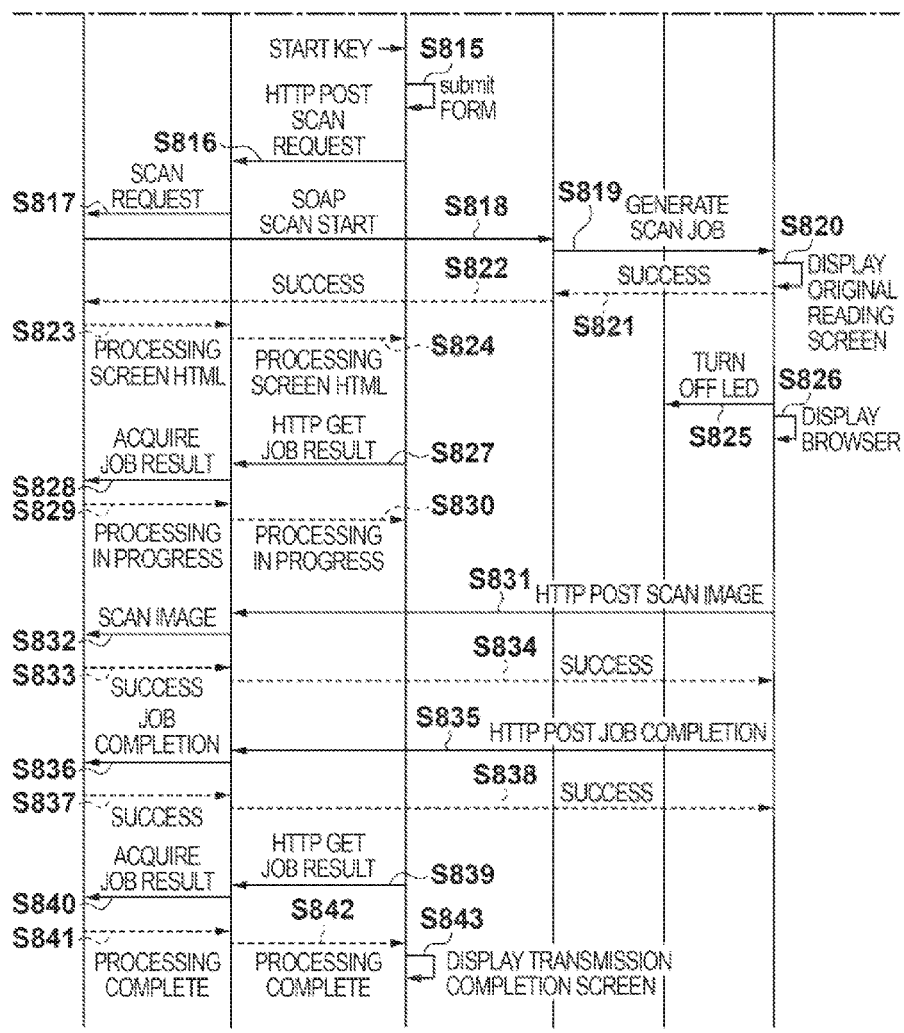

The description will now return to the flowchart in FIGS. 8A and 8B. In step S809, the web browser 500 transmits an HTTP request for requesting the acquisition of the device control JavaScript 910 to the HTTP server 600. In step S810, the HTTP server 600 requests the web application 610 to acquire the device control JavaScript 910. In step S811, the web application 610 responds by transmitting the device control JavaScript 910 to the HTTP server 600. In step S812, the HTTP server 510 transmits an HTTP response including the device control JavaScript 910 to the web browser 500.

When the reading color setting and format setting are selected on the scan setting screen 701, the web browser 500 executes the processing of step S813. In step S813, the web browser 500 processes the JavaScript described in the scan setting check portion 920 and displays the scan start screen 702 on the operation unit 219. As a result of processing the "Scan.ready" function defined in the device control JavaScript 910, the web browser 500 instructs the device control unit 520 to turn on the LED display unit 309 in step S814. The device control unit 520 causes the LED display unit 309 of the start key 303 to turn on.

Subsequently, upon accepting the input of the start key 303, the web browser 500 executes the processing of step S815. In step S815, given that the submit button "start" of the scan setting form 930 for the scan start screen 702 has been pressed, the web browser 500 submits the form. Furthermore, as a result of submitting the scan setting form 930, the web browser 500 transmits an HTTP request for requesting the start of scanning to the HTTP server 600 in step S816. FIG. 10 shows an example of an HTTP request for requesting the start of scanning. In the case of FIG. 10, it is shown that "fullcolor" is designated as the reading color, and "pdf" is designated as the format of the image file to be generated, and scanning is started.

Next, in step S817, the HTTP server 600 requests the web application 610 to start scanning. In step S818, the web application 610 transmits a SOAP request for requesting the start of scanning to the HTTP server 510 of the MFP 101. FIG. 11 shows an example of a SOAP request transmitted by the web application 610 in step S818. Specifically, after scanning an original and converting the original into a PDF file, an instruction to perform transmission to the web application 610 is given. A 300×300 resolution and full color are designated as the scan settings, PDF format is designated as the document setting, and host name "xxx.yyy.zzz" and path name "upload/test" are designated as the transmission settings.

Next, in step S819, the HTTP server 510 requests the job control unit 530 to generate a scan job. Upon interpreting the SOAP request, the job control unit 530 generates a scan job. In step S820, the job control unit 530 displays the reading screen 703 on the operation unit 219. In step S821, the job control unit 530 responds by transmitting a SOAP response indicating that the job generation was successful to the HTTP server 600. In step S822, the HTTP server 510 transmits the SOAP response indicating that the job generation was successful to the web application 610.

In step S823, the web application 610 transmits the screen information of the processing-in-progress screen 704 to the HTTP server 600. Subsequently, in step S824, the HTTP server 600 transmits an HTTP response including the screen information of the processing-in-progress screen 704 to the web browser 500. At this time, according to the processing of step S820, the reading screen 703 is being displayed on the operation unit 219, and the processing-in-progress screen 704 is not being displayed.

When the reading end button on the reading screen 703 is pressed, the job control unit 530 ends the reading of the original and executes the processing of step S825. In step S825, the job control unit 530 instructs the LED display unit 309 to turn off. Furthermore, in step S826, the job control unit 530 displays the web browser 500 on the operation unit 219. As a result, the processing-in-progress screen 704 is displayed on the operation unit 219, based on the information acquired in step S824.

In step S827, the web browser 500 transmits an HTTP request for acquiring the job result to the HTTP server 600. Specifically, in the processing-in-progress screen HTML, processing for repeatedly transmitting HTTP requests to the web application 610 is described in JavaScript. By processing the JavaScript, the web server 500 repeatedly transmits the job result acquisition request until the job completion response is received.

In step S828, the HTTP server 600 requests the web application 610 to acquire the job result. In step S829, if the job is not complete, the web application 610 transmits a response indicating that job processing is in progress to the HTTP server 600. In step S830, the HTTP server 600 transmits an HTTP response indicating that the job processing is in progress to the web browser 500. The web browser 500 repeatedly executes the processing of step S827 until the job completion response is received. Accordingly, in step S830, since the response indicating that processing is in progress was received, the web browser 500 thereafter repeatedly executes the processing of step S827 periodically.

When the reading of the original ends and an image file is generated, the job control unit 530 starts the processing of step S831. In step S831, the job control unit 530 transmits an HTTP request including the image file to the HTTP server 600. In step S832, the HTTP server 600 transmits the scan image to the web application 610. In step S833, the web application 610 responds by notifying the HTTP server 600 that the scan image transmission was successful. In step S834, the HTTP server 600 transmits an HTTP response indicating that the scan image transmission was successful to the job control unit 530.

Additionally, when the scan image is transmitted, the job control unit 530 executes the processing of step S835. In step S835, the job control unit 530 transmits an HTTP request for notifying that the job is complete to the HTTP server 600. In step S836, the HTTP server 600 notifies the web application 610 that the job is complete. In step S837, the web application 610 responds by notifying the HTTP server 600 that the job completion notification was successful. In step S838, the HTTP server 600 transmits an HTTP response for responding that the job completion notification was successful to the job control unit 530.

Similarly to the processing of steps S827 to S830, the processing of steps S839 to S842 is executed by the web browser 500 processing the JavaScript described in the processing-in-progress screen HTML. In step S839, the web browser 500 transmits an HTTP request for acquiring the job result to the HTTP server 600. In step S840, the HTTP server 600 requests the web application 610 to acquire the job result. In step S841, the web application 610 responds by notifying the HTTP server 600 of the job completion. In step S842, the HTTP server 600 transmits an HTTP response for responding that the job is complete to the web browser 500.

Upon receiving the notification of the job completion, the web browser 500 executes the processing of step S843. In step S843, the web server 500 displays the completion screen 705 by processing the JavaScript described in the processing-in-progress screen HTML.

Processing Procedure

Figure 12:
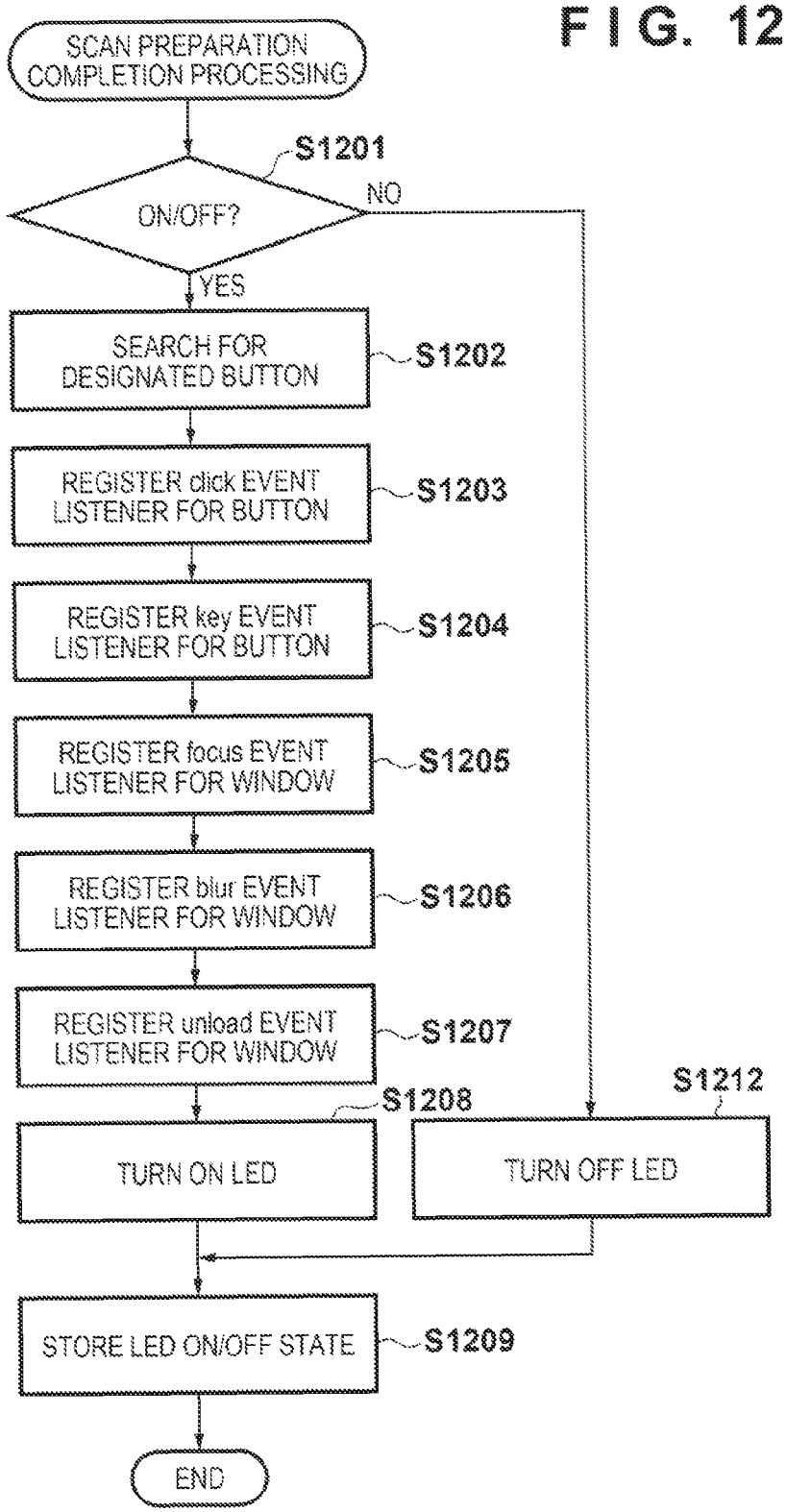
FIG. 12 is a flowchart showing a procedure of scan preparation completion processing executed by a web browser 500.
Figure 13:
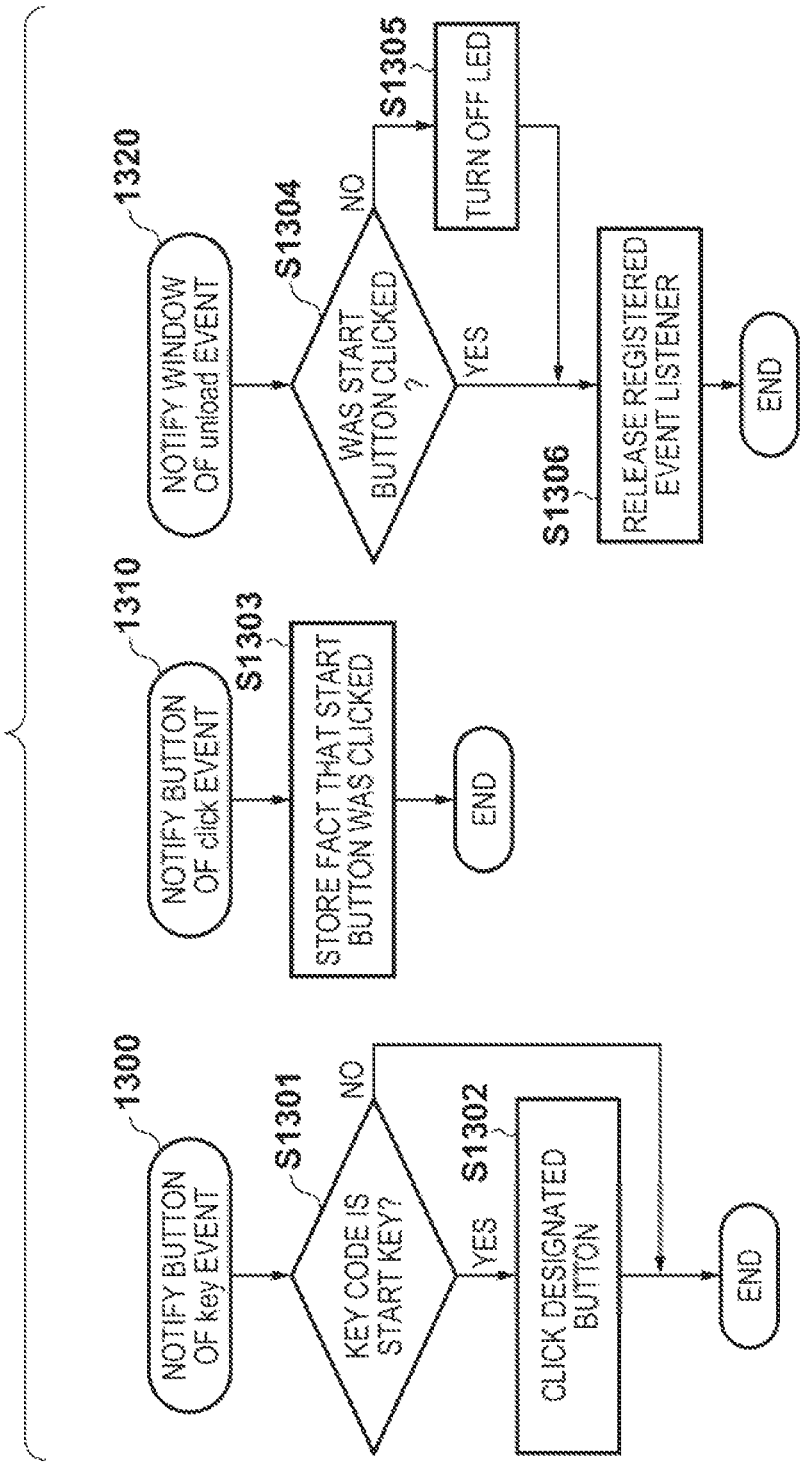
FIG. 13 is a flowchart showing a procedure of processing that is executed when the web browser 500 accepts the input of a start key 303.
Figure 14:
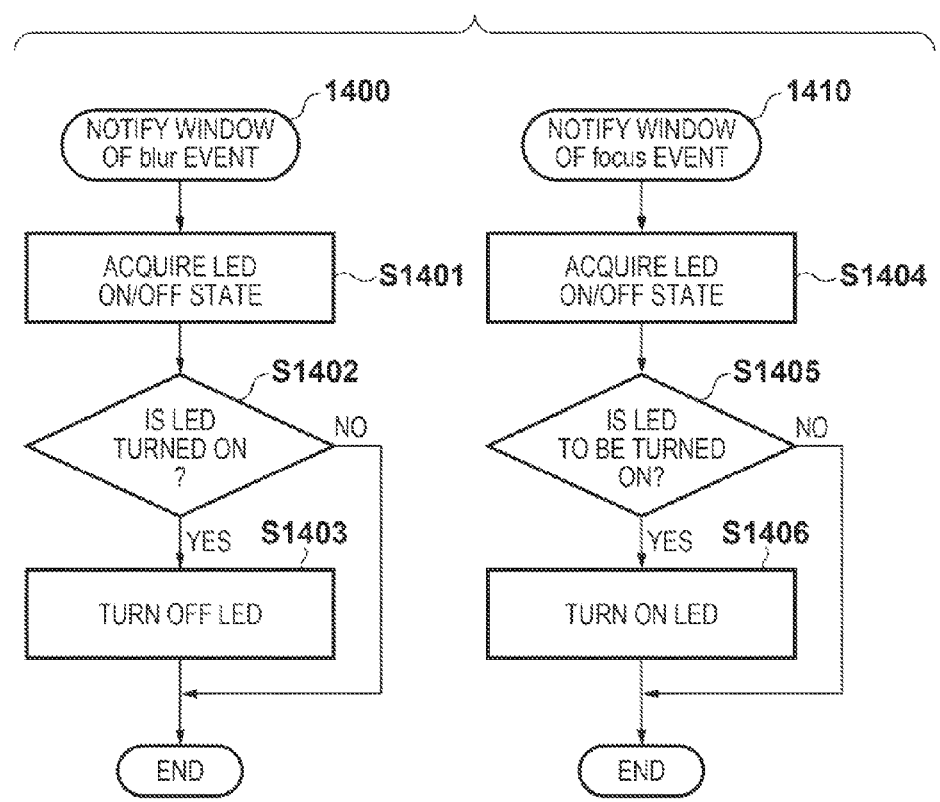
FIG. 14 is a flowchart showing a procedure of processing that is executed when the web browser 500 performs a screen transition between the web browser 500 and another screen.

A procedure of processing of the web browser 500 of the present embodiment will be described next with reference to the flowcharts shown in FIGS. 12 to 14. The below-described processing is realized by the CPU 211 reading out a control program stored in the ROM 212 to the RAM 213 and executing it. FIG. 12 shows a processing procedure for executing the "Scan.ready" function for the web browser 500 to instruct the scan preparation completion. Specifically, when the reading color and format are designated on the scan start screen 702, the processing of step S1201 is started.

In step S1201, the web browser 500 determines whether or not the LED display unit 309 is turned on. Specifically, if the second argument of the "Scan.ready" function is designated as "true", it is determined that the LED display unit 309 is turned on, and if it is designated as "false", it is determined that the LED display unit 309 is turned off. If it is determined that the LED display unit 309 is turned on, the procedure moves to the processing of step S1202, and if it is determined that it is turned off, the procedure moves to the processing of step S1212.

In step S1202, the web browser 500 searches for the designated button from the scan setting screen 701. Specifically, it searches for an element that has "start", which is designated by the first argument of the "Scan.ready" function, as an ID attribute, or in other words, the start button. Next, in step S1203, the web browser 500 registers a click event listener for the start button. As a result, when the start button is pressed on the scan setting screen 701, the web browser 500 notifies the start button by issuing a click event. Then, the web browser 500 executes the registered listener processing. The content of the click event listener processing will be described later with reference to FIG. 13. Subsequently, the web browser 500 moves to the processing of step S1204.

In step S1204, the web browser 500 registers a key event listener for the start button. As a result, when input of the start key 303 is accepted, the web browser 500 notifies the start button by issuing a key event. Then, the web browser 500 executes the registered listener processing. The content of the key event listener processing will be described later with reference to FIG. 13. Subsequently, the web browser 500 moves to the processing of step S1205.

In step S1205, the web browser 500 registers a focus event listener for the window. As a result, when the web browser 500 is displayed on the operation unit 219, the web browser 500 notifies the window by issuing a focus event. Then, the web browser 500 executes the registered listener processing. The content of the focus event listener processing will be described later with reference to FIG. 14. Subsequently, the web browser 500 moves to the processing of step S1206.

In step S1206, the web browser 500 registers a blur event listener for the window. As a result, when a screen other than the web browser 500 is displayed on the operation unit 219, the web browser 500 notifies the window by issuing a blur event. Then, the web browser 500 executes the registered listener processing. The content of the blur event listener processing will be described later with reference to FIG. 14. Subsequently, the web browser 500 moves to the processing of step S1207.

In step S1207, the web browser 500 registers an unload event listener for the window. The web browser 500 unloads a document when a page of a different URL is opened, or when the page is updated. The web browser 500 notifies the window by issuing an unload event when a document is to be unloaded. Then, the web browser 500 executes the registered listener processing. The content of the unload event listener processing will be described later with reference to FIG. 13. Subsequently, the web browser 500 moves to the processing of step S1208.

In step S1208, the web browser 500 instructs the device control unit 520 to turn on the LED display unit 309, and the procedure moves to the processing of step S1209. On the other hand, if it is determined in step S1201 that the LED display unit 309 is to be turned off, in step S1212, the web browser 500 instructs the device control unit 520 to turn off the LED display unit 309, and the procedure moves to the processing of step S1209.

In step S1209, the web browser 500 stores the on/off state of the LED display unit 309 in the RAM 213 or the HDD 214. Specifically, if the LED display unit 309 was turned on in step S1208, the fact that the LED is turned on is stored. On the other hand, if the LED display unit 309 was turned off in step S1209, the fact that the LED is turned off is stored. When the processing of step S1209 ends, the web browser 500 ends the scan preparation completion processing.

A procedure of processing of the web browser 500 will be described next with reference to the flowcharts 1300 to 1320 and 1400 to 1410 in FIGS. 13 and 14. The flowcharts show the processing registered in steps S1203 to S1207. The below-described processing is realized by the CPU 211 reading out a control program stored in the ROM 212 to the RAM 213 and executing it. First, the procedure of processing in the case where the web browser 500 accepts the input of the start key 303 will be described with reference to the flowchart 1300. When a key event is notified, the web browser 500 starts the processing of step S1301.

In step S1301, the web browser 500 determines whether or not the key code is the start key. If the key code is the start key, the procedure moves to the processing of step S1302, and if it is a hardware key other than a start key, the processing ends. In step S1302, the web browser 500 issues a click event to the start button associated with the start key, and the processing ends. Thus, when the input of a start key is accepted, it is possible to execute processing similar to that in the case where a button designated in advance by JavaScript description (software key) is pressed. In other words, according to the present embodiment, processing that is associated with a software key displayed on a screen of the web browser 500 provided by a web application is registered by a script as processing in the case where a predetermined hardware key is pressed. For example, in the present embodiment, the start key 303 is associated with the scan button of the scan start screen 702. By performing this kind of control, the information processing apparatus of the present embodiment realizes operability that is similar to a native application with a web application.

A processing procedure in the case where a start button of the web browser 500 is pressed will be described next with reference to the flowchart 1310. When a click event is notified to the start button, the web browser 500 starts the processing of step S1303.

In step S1303, the web browser 500 stores the fact that the start button was pressed, and the processing ends. Specifically, if the start key was input or the start button was pressed on the scan start screen 702, the web browser 500 executes the processing of step S1303. On the other hand, if the cancel button on the scan start screen 702 is pressed, the web browser 500 ends the processing.

A processing procedure in the case where the web browser 500 unloads a document (closes the scan start screen 702) will be described next with reference to the flowchart 1320. When the window is notified of an unload event, the web browser 500 starts the processing of step S1304.

In step S1304, the web browser 500 determines whether or not the start button was pressed. Specifically, if the processing of step S1303 has been executed, it is determined that the start button was pressed, and the procedure moves to the processing of step S1306. On the other hand, if the processing of step S1303 has not been executed, it is determined that the start button has not been pressed, and the procedure moves to the processing of step S1305. In step S1305, the web browser 500 instructs the device control unit 520 to turn off the LED display unit 309. For example, in the case where the cancel button of the scan start screen 702 is pressed and the processing-in-progress screen 704 is transitioned to, the LED display unit 309 turns off, and the procedure moves to the processing of step S1306.

In step S1306, the web browser 500 releases the event listeners that were registered in steps S1203 to S1207, and the processing ends. In this way, in the case where the start key 303 is input or the start button is pressed, the web browser 500 transitions to a different page with the LED display unit 309 turned on. On the other hand, in the case where the cancel button is pressed, a URL is input in the URL input field, or an update is instructed, and the web browser 500 turns off the LED display unit 309 and transitions to a different page. When the reading end button or the cancel button on the reading screen 703 is pressed, the job control unit 530 turns off the LED display unit 309 that is turned on.

A processing procedure of the web browser 500 in the case where a screen other than the web browser 500 is displayed on the operation unit 219 will be described next with reference to the flowchart 1400. Specifically, the flowchart 1400 shows a processing procedure of the web browser 500 in the case where, when the web browser 500 is displayed on the operation unit 219, the guide key 306 or the top menu key 307 is pressed and the guide screen or the top menu screen is displayed on the operation unit 219. When a screen other than the web browser 500 is displayed on the operation unit 219, the web browser 500 notifies the window by issuing a blur event. When the blur event is notified to the window, the web browser 500 starts the processing of step S1401.

In step S1401, the web browser 500 acquires the on/off state of the LED. The LED on/off state is stored in the RAM 213 or the HDD 214 in step S1209. When the processing of step S1401 ends, the web browser 500 moves to the processing of step S1402. In step S1402, the web browser 500 determines whether or not the LED display unit 309 is turned on. Specifically, if the LED on/off state acquired in step S1401 indicates that it is turned on, it is determined that the LED display unit 309 is turned on. On the other hand, if the LED on/off state indicates that it is turned off, or if no information is stored, it is determined that the LED display unit 309 is turned off. If it is determined that the LED display unit 309 is turned on, the web browser 500 moves to the processing of step S1403, and if it is determined that the LED display unit 309 is turned off, the processing ends.

In step S1403, the web browser 500 instructs the device control unit 520 to turn off the LED display unit 309, and the processing ends. In this way, in a state in which the web browser 500 is displaying the scan start screen 702 and the LED display unit 309 is turned on, when a transition to the guide screen or the top menu screen occurs, the web browser turns off the LED display unit 309 of the start key 303. Thus, according to the present embodiment, if the screen of the web browser 500 is not an active screen on the operation unit 219, or in other words, if another screen is displayed on top, control is performed such that the instruction for starting the execution of processing according to the start key 303 is not accepted.

A procedure of processing of the web browser in the case where the web browser 500 is displayed on the operation unit 219 will be described next with reference to the flowchart 1410. Specifically, the flowchart 1410 shows a processing procedure of the web browser 500 in the case where, when the guide screen is displayed on the operation unit 219, the guide key 306 is pressed and the web browser 500 is re-displayed on the operation unit 219. When the web browser 500 is displayed on the operation unit 219, the web browser 500 notifies the window by issuing a focus event. When the window is notified of the focus event, the web browser 500 starts the processing of step S1404.

In step S1404, the web browser 500 acquires the LED on/off state. The LED on/off state is stored in the RAM 213 or the HDD 214 in the above-described step S1209. Subsequently, in step S1405, the web browser 500 determines whether or not the LED display unit 309 is to be turned on. Specifically, if the LED on/off state acquired in step S1404 indicates that it is turned on, the LED display unit 309 is already turned on, and therefore it is determined that it is not necessary to turn it on. On the other hand, if the LED on/off state indicates that it is turned off, or if it is not stored, the LED display unit 309 is not turned on and therefore it is determined that it is to be turned on.

If the web browser 500 determines that the LED display unit 309 is to be turned on, the procedure moves to the processing of step S1406. On the other hand, if it is determined that it is not necessary for the LED display unit 309 to be turned on, the processing ends. In step S1406, the web browser 500 instructs the device control unit 520 to turn on the LED display unit 309, and the processing ends. Thus, when a transition to the scan start screen 702 is performed in a state where the web browser 500 is displaying the guide screen, or in other words, when the scan start screen 702 is displayed again as the topmost screen, the web browser 500 turns on the LED display unit 309 again.

In this way, according to the present embodiment, by the web browser 500 controlling a hardware key and an LED in accordance with a JavaScript description, it is possible to carry out job control with operability that is the same as that of a normal MFP.

Second Embodiment

Figure 15:
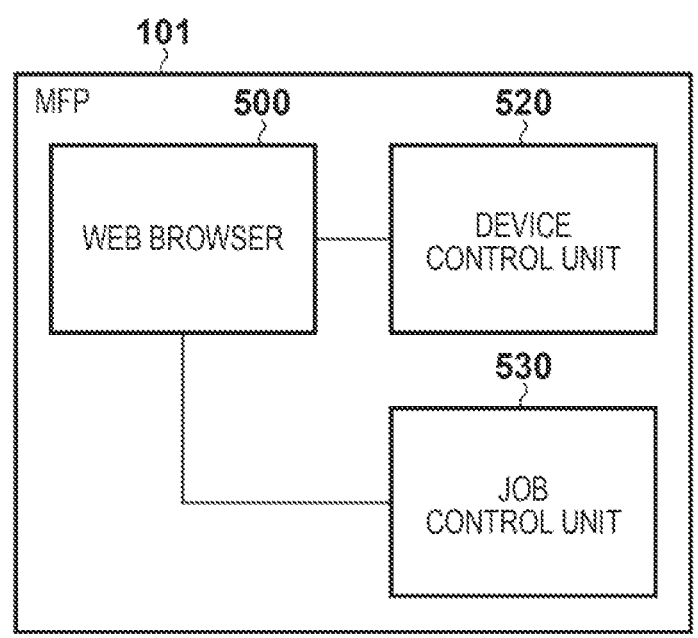
FIG. 15 is a block diagram showing a software configuration of the MFP 101 according to a second embodiment.
Figure 16A:
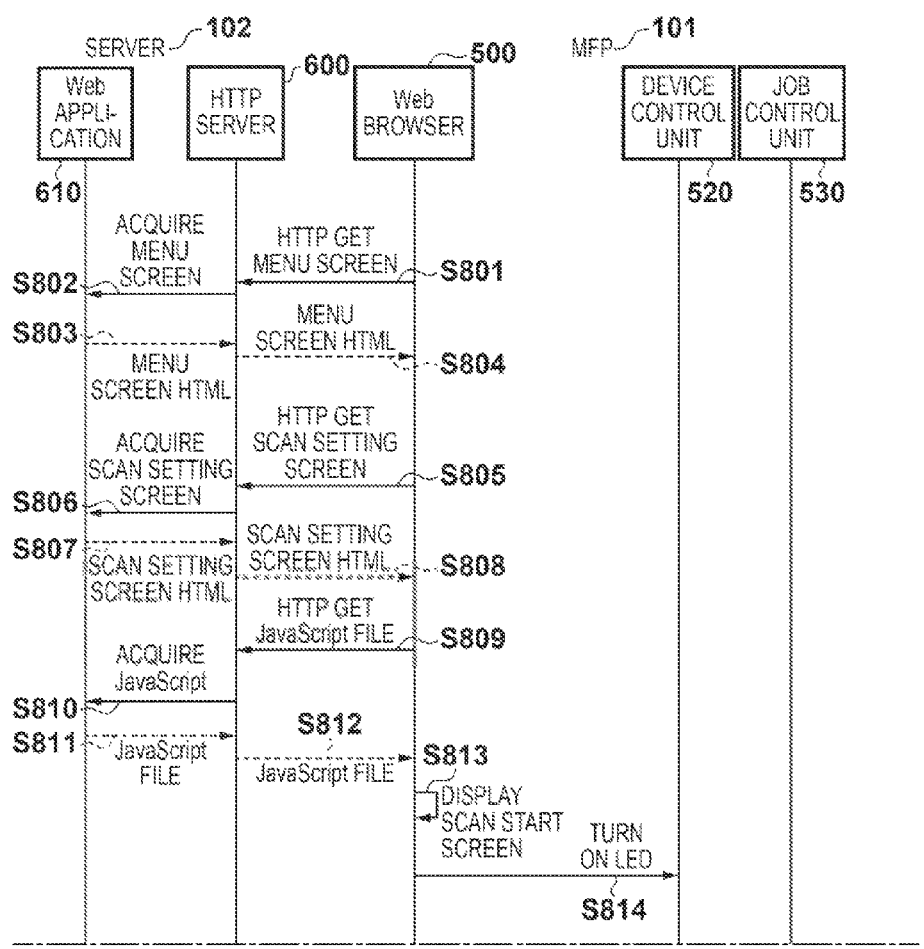
Figure 17A:
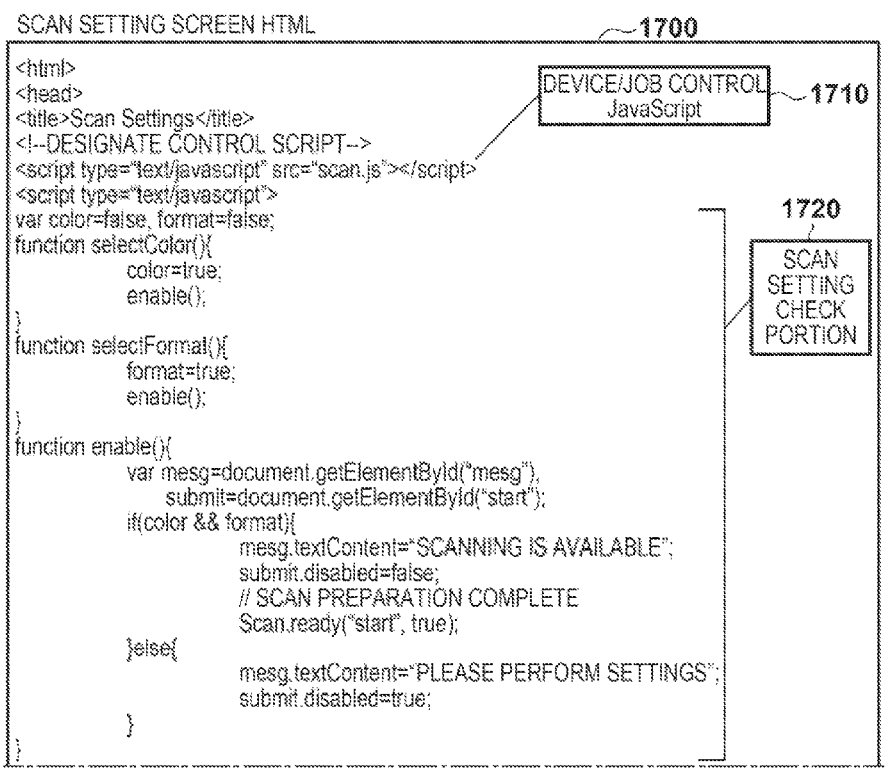

A second embodiment of the present invention will be described below with reference to FIGS. 15 to 17. The difference from the above-described first embodiment is that job control is realized by the web browser 500 processing the JavaScript described in the scan setting screen HTML 900. Note that mainly the differences between the first and second embodiments will be described below.

Software Configuration of MFP

First, a software configuration of the MFP 101 according to the present embodiment will be described with reference to FIG. 15. The difference from the software configuration of the MFP 101 according to the first embodiment is that the HTTP server 510 is not included in the MFP 101. In the configuration of the second embodiment, the web browser 500 directly controls the device control unit 520 and the job control unit 530. The device control unit 520 and the job control unit 530 do not receive an HTTP request assigned by the HTTP server 510 or respond with an HTTP response.

Processing Sequence

A processing sequence executed in the information processing system of the present embodiment will be described next with reference to FIGS. 16A and 16B. The difference between the first embodiment and the present embodiment is the processing shown in step S1601. As shown in FIGS. 8A and 8B, in steps S818 to S822 of the first embodiment, the web application 610 requested the job control unit 530 to perform scan job generation by transmitting a SOAP request to the HTTP server 510.

On the other hand, in the present embodiment, the web browser 500 requests the job control unit 530 to perform scan job generation by processing the JavaScript described in scan setting screen HTML 1700 in step S1601.

Scan Setting Screen HTML

Next, an example of the scan setting screen HTML 1700 according to the present embodiment will be described with reference to 17A and 17B. The differences between the present embodiment and the first embodiment are device/job control JavaScript 1710 and a scan job execution portion 1730.

The device control JavaScript 910 of the first embodiment defined the script for instructing the device control unit 520 to turn on and turn off the LED display unit 309. On the other hand, in addition to the script for instructing the device control unit 520 to turn on and turn off the LED display unit 309, the script for instructing the job control unit 530 to execute the job is defined in the device/job control JavaScript 1710 of the present embodiment. Furthermore, the reading color and generation format set in a scan setting form 1740 are scan settings, and JavaScript for requesting the job control unit 530 to perform job generation is described in the scan job execution portion 1730.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-243850 filed on Nov. 5, 2012, which is hereby incorporated by reference herein in its entirety.

What is claimed is:

1. An image reading apparatus comprising:
   a scanner unit;
   a start key for causing the scanner unit to start a scan process;
   a light emitting unit corresponding to the start key;
   a reception unit configured to receive HTML data from a web server, the HTML data comprising data for displaying a scan setting screen;
   a display unit configured to display (i) the scan setting screen in accordance with the HTML data and (ii) a second screen that is different from the scan setting screen;
   a control unit configured to turn on the light emitting unit in response to a script for enabling the start key being included in the HTML data,
   an obtaining unit configured to obtain an instruction for activating the second screen;
   a determination unit configured to determine whether or not the light emitting unit is turned on; and
   a turn off unit configured to turn off the light emitting unit in a case where the obtaining unit obtains the instruction for activating the second screen and the determination unit determines that the light emitting unit is turned on,
   wherein the control unit is configured to, when the start key is pressed while the light emitting unit is turned on, control the scanner unit to start a scan process based on a scan parameter set via the scan setting screen.

2. The image reading apparatus according to claim 1, wherein the scan parameter includes a color designation or a format designation.

3. The image reading apparatus according to claim 1, wherein the control unit is configured to notify the web server when the start key is pressed, and
   wherein the control unit starts the scan process in accordance with an instruction from the web server that received the notification from the control unit.

4. The image reading apparatus according to claim 1, wherein the script is a JavaScript script.

5. The image reading apparatus according to claim 1, further comprising:
   a transmission unit configured to transmit, to the web server, image data obtained by the scan process started by the control unit.

6. An image reading method for an image reading apparatus that includes (i) a scanner unit, (ii) a start key, for causing the scanner unit to start a scan process, and (iii) a light emitting unit corresponding to the start key, the image reading method comprising:
   receiving HTML data from a web server, the HTML data comprising data for displaying a scan setting screen;
   displaying the scan setting screen in accordance with the HTML data;
   turning on the light emitting unit in response to a script for enabling the start key being included in the HTML data;
   obtaining an instruction for activating a second screen that is different from the scan setting screen;
   determining whether or not the light emitting unit is turned on;
   turning off the light emitting unit in a case where the instruction for activating the second screen is obtained and it is determined that the light emitting unit is turned on; and
   controlling, when the start key is pressed while the light emitting unit is turned on, the scanner unit to start a scan process based on a scan parameter set via the scan setting screen.

7. A non-transitory computer-readable storage medium storing a program for causing a computer to execute an image reading method for an image reading apparatus that includes (a) a scanner unit, (b) a start key for causing the scanner unit to start a scan process, and (c) a light emitting unit corresponding to the start key, the image reading method comprising:
   receiving HTML data from a web server, the HTML data comprising data for displaying a scan setting screen;
   displaying the scan setting screen in accordance with the HTML data;
   turning on the light emitting unit in response to a script for enabling the start key being included in the HTML data;
   obtaining an instruction for activating a second screen that is different from the scan setting screen;
   determine whether or not the light emitting unit is turned on;
   turning off the light emitting unit in a case where the instruction for activating the second screen is obtained and it is determined that the light emitting unit is turned on; and controlling, when the start key is pressed while turning on the light emitting unit, the scanner unit to start a scan process based on the scan parameter set via the scan setting screen.

8. The image reading apparatus according to claim 1, wherein the scan parameter includes a color designation and a format designation.

\* \* \* \* \*